United States Patent [19]

Hayden

[11] 4,381,271

[45] Apr. 26, 1983

[54] USE OF FIRED FIBROUS GRAPHITE IN FABRICATING POLYCRYSTALLINE DIAMOND AND/OR CUBIC BORON NITRIDE/SILICON CARBIDE/SILICON COMPOSITE BODIES

[75] Inventor: Stephen C. Hayden, Columbus, Ohio

[73] Assignee: General Electric Company, Worthington, Ohio

[21] Appl. No.: 230,219

[22] Filed: Feb. 2, 1981

[51] Int. Cl.³ .......................................... C04B 35/60
[52] U.S. Cl. .................................. 264/29.5; 51/295; 264/29.1; 264/60
[58] Field of Search ............... 264/60, 332, 29.1, 29.2, 264/29.5; 51/295

[56] References Cited

U.S. PATENT DOCUMENTS

| | | | |
|---|---|---|---|
| 3,926,571 | 12/1975 | Labassier | 29/195 |
| 4,089,931 | 5/1978 | Sharma | 423/290 |
| 4,148,894 | 4/1979 | Hillig et al. | 428/242 |
| 4,220,455 | 9/1980 | St. Pierre et al. | 51/295 |
| 4,238,433 | 12/1980 | Hillig et al. | 264/60 |
| 4,242,106 | 12/1980 | Morelock | 51/307 |

*Primary Examiner*—James H. Derrington
*Attorney, Agent, or Firm*—Douglas B. Little

[57] ABSTRACT

Disclosed is an improvement in a process for fabricating a polycrystalline diamond and/or cubic boron nitride-silicon carbide-silicon composite body fabricated by infiltrating silicon through a mixture of a carbonaceous material and non-diamond carbon coated diamond and/or cubic boron nitride under partial vacuum at elevated temperature. Such improvement comprises providing fibrous graphite for inclusion in the mixture, said fibrous graphite being subjected to heat treatment at a temperature of between about 800° and 1700° C. prior to its inclusion in the mixture and at a temperature of between about 800° and 1550° C. after its inclusion in the mixture. Such heat treatment is conducted under a total pressure of less than about 1 Torr. The vacuum silicon infiltration then is practiced on the mixture which includes the heat treated graphite fibers.

7 Claims, 2 Drawing Figures

USE OF FIRED FIBROUS GRAPHITE IN FABRICATING POLYCRYSTALLINE DIAMOND AND/OR CUBIC BORON NITRIDE/SILICON CARBIDE/SILICON COMPOSITE BODIES

BACKGROUND OF THE INVENTION

The present invention relates to the production of a polycrystalline body comprised of a mass of diamond and/or cubic boron nitride crystals bonded together by a medium comprised of silicon carbide and elemental silicon, and more particularly to a method for improving the density and degree of bonding of such composites.

While a wide variety of techniques have been proposed for forming said polycrystalline bonded composite bodies, a preferred method for fabricating such bodies is disclosed in commonly-assigned U.S. Pat. No. 4,220,455, the disclosure of which is expressly incorporated herein by reference. Briefly stated, such patent discloses a process which utilizes a partial vacuum for improving the infiltration of fluid silicon during the fabrication of such composite bodies. Somewhat similar processes are disclosed in U.S. Pat. Nos. 4,238,433 and 4,242,106. The improved silicon infiltration enables a denser, more completely bonded composite body to be fabricated than was feasible prior to the invention disclosed in such patent.

One drawback in the process of such patent became apparent when such process was practiced in the fabrication of bodies of large volume, e.g. volumes greater than about 10 mm$^3$. The drawback noted was that porosity and unbonded surfaces in the bulk were discovered upon finish grinding of the composite bodies which conditions resulted in a composite body which was unacceptable for many intended applications, such as wear surfaces and cutting tools. The porosity was reduced by retarding the heating rate to infiltration temperature to about 10° C. per minute or slower; however, the described conditions still remained to such a degree that the resulting composite body still was unacceptable for some intended applications. It is opined that volatile impurities in the materials of fabrication do not completely volatilize or, if volatilized during the infiltration process, are unable to escape from the body, thus resulting in porosity and unbonded surfaces in the bulk. While the slower heating rates to infiltration temperature apparently permitted additional quantities of such impurities to escape from the bulk, sufficient impurities apparently remain in the body. Further, dimensional tolerances without use of fixed boundaries on all surfaces of the composite during fabrication were found not to be possible due to the unacceptable level of porosity and unbonded surfaces in the bulk.

The present invention solves the problems of porosity and unbonded surfaces in the body of the composite bulk by employment of a vacuum firing step which will be disclosed in detail herein.

BROAD STATEMENT OF THE INVENTION

The present invention is an improvement in the process for making a shaped polycrystalline body comprised of a mass of crystals selected from diamond, cubic boron nitride, and combinations thereof, adherently bonded together by a bonding medium of silicon carbide and elemental silicon. Such shaped body may be made from a mixture of non-diamond carbon coated crystals, elemental silicon, and fibrous graphite. The carbon coating on the crystals is not absolutely necessary.

Preferably, the shaped body is made from a substantially uniform mixture of said crystals and a carbonaceous material such that none of the surfaces of said crystals are exposed significantly and substantially all of said crystals are enveloped and separated by at least a coherent continuous coating of the carbonaceous material on the crystals, wherein the carbonaceous material is selected from elemental non-diamond carbon, an organic material which completely decomposes at a temperature below 1400° C. to elemental non-diamond carbon and gaseous products of decomposition, and mixtures thereof.

The present process improvement for decreasing the porosity and increasing the density of the body comprises subjecting the fibrous graphite to a heat treatment under a partial vacuum of less than about 1 Torr as follows: (1) for said fibrous graphite prior to its inclusion in said mixture, a temperature of between about 800° C. and 1700° C. followed by formation of the mixture including the treated fibrous graphite, and (2) for said mixture including said fibrous graphite, a temperature of between about 800° C. and 1550° C.

A preferred method for making the shaped polycrystalline body comprises placing the mixture in the cavity of a mold; associating a mass of solid silicon with said mixture in said cavity; providing a partial vacuum within the mold structure; heating the associated mold structure under said partial vacuum to a temperature above 1400° C. at which said silicon is fluid for infiltrating said fluid silicon through said mixture, said infiltrating silicon reacting with said non-diamond elemental carbon (or with diamond itself in the case of uncoated diamond crystals) for forming said silicon carbide; and cooling the resulting infiltrated mass of crystals and recovering same. The functions of the vacuum are: the removal of trapped gas from the mixture inside the mold cavity, prevention of diamond graphitization, and the prevention of silicon oxidation. A convenient means of accomplishing these ends is placing the mold structure and associated silicon inside a vacuum furnace.

The bonded crystals range by volume in said shaped body from about 1% up to but less than 70% by total volume of the body. In two preferred methods for making the shaped polycrystalline body, the fibrous graphite in the mixture, when the mixture is associated with the solid silicon, is heat-treated fibrous graphite; or the mixture including the non-treated fibrous graphite is subjected to the heat treatment followed preferably by compaction or recompaction of the mixture and thence the solid silicon association step of the process.

Advantages of the present invention include the ability to maintain dimensional tolerances of the shaped body without fixed boundaries being required on all surfaces of the composite during fabrication thereof. Another advantage is the ability to produce dense, completely bonded composites which are useful as or in forming wear parts and cutting tools. A further advantage of the present invention is the ability to fabricate bodies of large volume, e.g., a volume greater than about 10 mm$^3$, and the ability to fabricate such large volume bodies which are dense and completely bonded structures. These and other advantages will be readily apparent to those skilled in the art based upon the disclosure contained herein.

Figure 1:
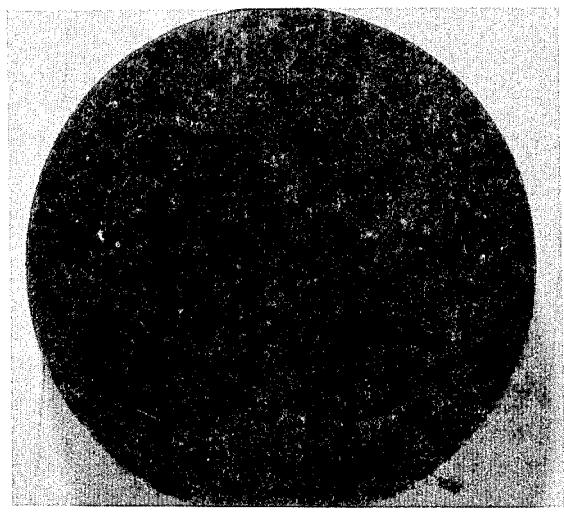
FIG. 1 is a photomicrograph (magnified 6.5X) of a polished section of the diamond/SiC/Si composite disc fabricated from fibrous graphite treated in accordance with the present invention and identified as Sample 1 in Example 1.

The drawings will be described in detail in connection with Example 1.

DETAILED DESCRIPTION OF THE INVENTION

Fibrous graphite is used in fabricating the composite bodies of the present invention because such fibers promote the infiltration of fluid silicon by a capillary action. Such capillary infiltration assists in achieving a full flowthrough of the silicon throughout the interior of the body during its fabrication. For present purposes, graphite is "fibrous" when it promotes such capillary infiltration. This usually translates to a length to width ratio of the graphite of greater than 2:1, advantageously between 2:1 and about 10:1, and preferably such ratio is about 3:1 to 4:1.

Porosity, and correspondingly the density of the composite body, at least in part arises from gases or vapors trapped within the interior of the body during fabrication thereof. Escape of such trapped gases necessarily depends on the ratio of the volume to the surface area of the body. A second factor relative to porosity relates more directly to the silicon infiltration step of the process and involves the infiltration length, i.e. the distance the silicon must travel from its entry into the body to the opposite side of the body. For large volume compacts, silicon carbide formation can block further fluid silicon infiltration. Use of fibrous graphite aids in ensuring the full flow-through of silicon through the body. For most shaped compacts, the volume-to-surface area ratio and infiltration length impact the infiltration of silicon at a volume of about 10 mm$^3$ and larger.

Subjecting the fibrous graphite to the vacuum heat treatment process of the present invention unexpectedly, but dramatically, improves the density of the resulting composite body as well as decreases the incidence of unbonded surfaces in the bulk. While the reasons underlying the invention are not fully understood, it is opined that certain residual impurities are associated with the fibrous graphite which impurities volatilize during the vacuum infiltration step of the fabrication process. The volatilized impurities cannot fully escape from the interior of the body, thus creating porosity and unbonded surfaces in the bulk of the body. No particular impurities or contaminants have been noted as being evolved from cursory evaluation of the fibrous graphite during vacuum heat treatment thereof. Regardless of the foundation upon which the invention achieves its purpose, the purpose of increasing the density and improving the surface bonding within the composite body is achieved through the present invention.

The present invention has at least two distinct embodiments for its practice. The preferred embodiment involves subjecting the fibrous graphite itself to the vacuum heat treatment process prior to utilizing the fibrous graphite in formation of the composite body. Practice of this embodiment is as easy as placing the graphite fiber alone in a suitable boat, e.g. a graphite boat, and subjecting such graphite fiber to a temperature of between about 800° C. and 1700° C. while maintaining a partial vacuum of less than about 1 Torr and preferably less than about 0.1 Torr. Preferred heating temperature for the vacuum heat treatment process ranges from about 1300° C. to 1550° C. The heating is practiced for a time adequate so that the ultimate heat treated graphite fiber forms an improved composite body. This translates to a heating time normally ranging from about 1 to 5 minutes.

The treated fibrous graphite then is mixed with diamond and/or CBN, and possibly other carbonaceous material, and this mixture is transferred to a mold for processing in accordance with the teachings of U.S. Pat. No. 4,220,455. Surprisingly, it was determined that wide latitude in handling procedures of the treated fibrous graphite could be implemented prior to its admixture with diamond and/or CBN and other optional carbonaceous material. Thus, the treated fibrous graphite can be exposed to air (atmospheric oxygen) without any apparent recontamination of the treated fibrous graphite, e.g. by adsorption or other surface phenomena. Moreover, the treated fibrous graphite can be stored for extended periods of time (e.g. several days) in a closed container before use in forming the compact. The unexpected stability of the treated fibrous graphite lends flexibility to commercial implementation of the present invention, for example, by permitting preparation of a large quantity of the treated graphite fibers adequate for preparing several silicon infiltration batches at a time or for preparing several of such infiltration batches over extended periods of time.

An alternative embodiment of the present invention involves the initial formation of a substantially uniform mixture of crystals (which may be coated with non-diamond carbon) and fibrous graphite. This substantially uniform mixture, which may be compacted, is subjected to a temperature of between about 800° C. and 1550° C. under the partial vacuum of less than about 1 Torr for effecting the vacuum heat treatment process of the present invention.

Upon completion of the vacuum heat treatment process, about 1–5 minutes, the batch is cooled to near room temperature and the vacuum released. The treatment decreases the effective density of the resulting treated mixture making it appear fluffy. Accordingly, the treated mixture is tamped down or compacted in conventional fashion. Note that the vacuum heat treatment of the mixture conveniently may be practiced with the mixture in the mold used for the subsequent silicon infiltration process of U.S. Pat. No. 4,220,455. Using this procedure, as further explained in detail below, a mass of silicon then is disposed near the mold containing the treated mixture in such a way to permit the passing of fluid silicon into the mold-confined preheated mixture at operating temperature and vacuum. Conveniently, the silicon placement is accomplished by placing the silicon in a reservoir which comprises an upper portion of the mold, as shown in FIG. 1 of U.S. Pat. No. 4,220,455.

Regardless of the embodiment employed for carrying out the precepts of the present invention, the composite body including treated graphite fibers is fabricated preferably in accordance with the teachings of U.S. Pat. No. 4,220,455. As stated in such patent, the composite body of predetermined shape and size is made from a substantially uniform mixture of diamond and/or cubic boron nitride crystals and a carbonaceous material where none of the surfaces of the crystals are exposed significantly and wherein at least a substantial amount of the crystals are enveloped and separated from each other by at least a coherent continuous coating of the carbonaceous material on the crystals. Such mixture additionally includes the treated graphite fiber according to the present invention. As noted in such patent, the diamond crystals used in the present process can be natural or synthetic. The diamond and/or cubic boron nitride crystals of the present invention can range in size in largest dimension from submicron up to about 2000 microns, and generally up to about 1000 microns. The particular size or sizes used depends largely on the particular packing or density of crystals desired and also on the resulting body. For most abrasive applications, crystals no greater than about 60 microns are preferred. Preferably, to maximize the packing of the crystals, they should be size-graded to contain a range of sizes, i.e. small, medium and large-sized crystals. Preferably, the size-graded crystals range from about 1 micron to about 60 microns, and preferably within this size range, about 60% to about 80% by volume of the total mass of crystals are of the larger sized portion of the range, about 5% to about 10% by volume are of medium size with the balance constituting the small-sized crystals or particles.

Sizing of the crystals is facilitated by the jet-milling of larger crystals. Preferably, the crystals are chemically cleaned to remove any oxides or other impurities from the surface thereof before use in the present process. This may be accomplished by heating the crystals in hydrogen at about 900° C. for about one hour.

The carbonaceous material can be elemental non-diamond carbon, an organic material, or mixtures thereof. The organic material decomposes completely at an elevated temperature below 1400° C., and ordinarily decomposes completely at a temperature ranging from about 50° C. to about 1200° C., to produce elemental non-diamond carbon and gaseous product of decomposition.

Representative of the organic materials useful in the present process are polymers of aromatic hydrocarbons such as polyphenylene and polymethylphenylene, derivatives of polynuclear aromatic hydrocarbons contained in coal tar such as dibenzanthracene and chrysene. Additional examples of useful organic materials are the epoxy resins such as the reaction product of epichlorohydrin and Bisphenol-A. Still additional examples of useful organic materials are phenolic resins obtained by the condensation of phenol or substituted phenols with aldehydes such as formaldehyde, acetaldehyde, and furfural. Specific examples are the condensation products of phenol-formaldehyde, resorcinol-formaldehyde, aniline-formaldehyde, and cresol-formaldehyde.

The process of fabricating the composite body desirably is carried out in an apparatus such as that apparatus shown and described in U.S. Pat. No. 4,220,455. As noted in such patent, the confined mixture and silicon are heated to infiltration temperature which is above 1400° C. When the carbonaceous material is an organic material, such organic material decomposes completely at a temperature below 1400° C. producing elemental non-diamond carbon and gaseous product of decomposition. The mold-confined mass or mixture that is infiltrated by the silicon consists essentially of crystals, i.e. diamond, cubic boron nitride or combinations thereof, treated fibrous graphite, and elemental non-diamond carbon.

The elemental non-diamond carbon in the mold-confined mixture must be at least slightly porous to allow the silicon to infiltrate therethrough. Specifically, the elemental non-diamond carbon may range in porosity but its density should not exceed 0.96 g/cc. If the elemental non-diamond carbon is more dense than 0.96 g/cc, fluid elemental silicon may not penetrate it, or if it should penetrate such a dense elemental non-diamond carbon, the resulting body will puff up and be distorted. The maximum porosity of the elemental non-diamond carbon is that which maintains the shape of the mold-confined mixture with none of the surfaces of the crystals being exposed significantly. Generally, the maximum porosity for the elemental non-diamond carbon is about 50% by volume of the total volume of the elemental non-diamond carbon present in the mold-confined shaped mixture.

The present infiltration is carried out at a temperature above 1400° C. at which silicon becomes fluid and which has no significant deleterious effect on the crystals. For cubic boron nitride crystals infiltration temperatures significantly higher than about 1450° C. are not useful since they are likely to cause conversion to hexagonal boron nitride. On the other hand, for diamond crystals, temperatures higher than 1550° C. provide no significant advantage. By a temperature at which silicon becomes fluid it is meant herein a temperature at which the silicon is readily flowable. The fluid silicon is highly mobile and highly reactive with elemental non-diamond carbon, i.e. it has an affinity for elemental non-diamond carbon, wetting it and reacting with it to form silicon carbide. It also reacts with diamond itself to form silicon carbide. Specifically, when silicon is at its melting temperature, which has been given in the art to range from about 1412° C. to about 1430° C., it has a high viscosity, but as its temperature is raised, it becomes less viscous and at a temperature about ten degrees higher than its melting point, it becomes fluid. The temperature at which the silicon is fluid is the temperature at which it will infuse or infiltrate through the capillary-size passages, interstices or voids of the present mold-confined mixture of crystals, treated fibrous graphite, and elemental non-diamond carbon. With increase in temperature, the flowability of the fluid silicon increases resulting in a faster rate of reaction.

Sufficient silicon is infiltrated throughout the mold-confined mass or mixture, infusing or infiltrating through the voids or pores of the mixture by capillary action to react with the total amount of elemental non-diamond carbon (including fibrous graphite) present in the confined mixture forming silicon carbide, and also to fill any pores or voids which may remain after formation of the silicon carbide producing an integral, strongly bonded and at least substantially pore-free body. Specifically, silicon carbide occupies more volume than elemental non-diamond carbon thereby reducing porosity, and any pores remaining after formation of silicon carbide are filled during infiltration with elemental silicon. Also during infiltration, the silicon reacts with the elemental non-diamond carbon coating on the surfaces of the crystals forming a protective adherent coating of silicon carbide on the diamond surfaces and causing no loss or no significant loss of crystal and no change or no significant change in the shape and dimensions of the crystals. The resulting infiltrated mass is cooled in an atmosphere which has no significant deleterious effect on said infiltrated mass, preferably it is furnace cooled in the partial vacuum to about room temperature, and the resulting polycrystalline body is recovered.

As mentioned earlier, the non-diamond carbon coating on the crystals (which can be obtained by exposing the crystals to carbon obtained by pyrolysis of methane in a furnace) is not absolutely required. The crystals may be used in uncoated form which has the advantage of eliminating the coating step. However, in the case of diamond especially, the silicon will react with the available diamond carbon to form silicon carbide, consuming valuable diamond in the process.

The period of time for full infiltration by the silicon is determinable empirically and depends largely on the size of the shaped mixture, and frequently, infiltration by the fluid silicon through the mold-confined shaped mixture is completed within about 15 minutes.

One particular advantage of this invention is that the present polycrystalline body can be produced directly in a wide range of sizes and shapes which heretofore could not be manufactured or required expensive and tedious machining because of the very nature of the material. For example, the present body can be as long as several inches, or as long as desired, and be of very complex geometry, and specifically, it can be produced in the form of a tube or a hollow cylinder, a ring, a sphere or a bar having a sharp point at one end. Also, since the present polycrystalline body is produced in a predetermined configuration of predetermined dimensions, it requires little or no machining.

A portion of the polycrystalline body produced by the present invention can be soldered, brazed or otherwise adhered to a suitable support material such as sintered or hot-pressed silicon carbide, sintered or hot-pressed silicon nitride, or a cemented carbide, or a metal such as molybdenum forming a tool insert which, for example, can be held by a tool shank adapted to be held in a machine tool whereby the exposed surface of the polycrystalline body can be used for direct machining. Alternatively, the present polycrystalline body can be mechanically clamped to a lathe tool for direct machining by the exposed surface of the polycrystalline body.

The ultimately formed composite bodies of the present invention then can be used as wear surfaces, cutting tool blanks and inserts, twist drill points, saw and core drill segments, and other such applicable articles. The following examples show in detail how the invention can be practiced but should not be construed as limiting. In this application, all temperatures are in degrees Centigrade, all proportions are by volume, all mesh sizes are in United States Standard Sieves Series, and all units are in the metric system, unless otherwise expressly indicated. Also, all references cited herein are expressly incorporated herein by reference.

IN THE EXAMPLES

All of the composite bodies fabricated in the examples were made by the silicon vacuum infiltration technique described in U.S. Pat. No. 4,220,455, except that the fibrous graphite was subjected to the vacuum firing treatment of the present invention. Briefly, the fibrous graphite was made from cut woven cloth which had been subjected to about 3 minutes milling time in an oscillating ball mill loaded with steel balls. The graphite fibers had a nominal length:width ratio of between about 3:1 and 4:1.

The diamond and cubic boron nitride used in the examples had a uniform continuous coating of pyrolytic carbon resulting from the decomposition of natural gas heated to a temperature of about 1200° C. Molds used for silicon infiltration either were graphite lined with hexagonal boron nitride or were hexagonal boron nitride. An apparatus like that shown and described in U.S. Pat. No. 4,220,455 was utilized for vacuum silicon infiltration at a temperature ranging from about 1450° to 1500° C.

EXAMPLE 1

Two diamond/SiC/Si wear test discs were fabricated for evaluation. The discs were approximately 1.27 cm (½ inch) in diameter and were ground to about 0.32 cm (⅛″) thickness using a standard resin bonded grinding wheel containing 60/80 mesh diamond grit (i.e. the particles passed through a 60 mesh screen but were retained on the 80 mesh screen). Each disc contained 200/230 mesh diamond grit at a volume concentration of 70%. Each disc was infiltrated with silicon in identical fashion, except that Sample 1 (inventive sample) utilized graphite fibers which had been previously subjected to vacuum heat treatment at 1450°–1500° C. under a total pressure of less than 100 millitorr for about 5 minutes prior to its inclusion with the diamond grit; and Sample 2 (comparative sample) utilized non-treated graphite fibers.

Figure 2:
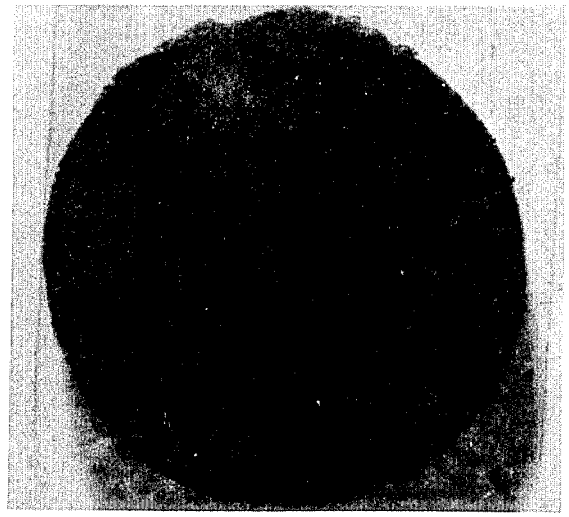
FIG. 2 is a photomicrograph (magnified 6.5X) of a polished section of the diamond/SiC/Si composite disc fabricated in accordance with U.S. Pat. No. 4,220,455 from untreated fibrous graphite and identified as Sample 2 in Example 1.

The differences in porosity and degree of bonding can be seen visually in the figures which are photomicrographs (approximately 6.5X magnification) of the ground surfaces of the two discs. Note the irregular hole remaining in Sample 2 (FIG. 2). The surface of Sample 1 (FIG. 1) is smoother than and exhibits no holes compared to Sample 2 fabricated in accordance with U.S. Pat. No. 4,220,455.

The beneficial results imparted by the vacuum heat treatment of the fibrous graphite clearly are established.

EXAMPLE 2

Another disc of the same dimensions, diamond particle size, and diamond volume concentration as in Example 1 was fabricated. In this example, however, the non-diamond carbon-coated diamond and fibrous graphite were placed in a mold, and the filled mold placed in a furnace heated to approximately 1500° C. under a total pressure of less than about 100 millitorr. After about 5 minutes heating time under vacuum, the mixture was cooled, removed from the furnace, recompacted, and then silicon infiltrated. The resulting composite disc was dense and its ground surface exhibited no holes.

EXAMPLE 3

Several CBN/SiC/Si composites were fabricated in the shape of a rectangular solid with dimensions of about 1.30 cm×1.30 cm×0.48 cm (0.51×0.51×0.19 inches). The CBN was size graded at 325/400 mesh and both 30% and 50% by volume composites were fabricated. The fibrous graphite was fired at 1500° C. under a total pressure of less than about 100 millitorr for about 5 minutes prior to its admixture with the non-diamond carbon coated CBN. The resulting silicon infiltrated composites were dense and exhibited no visible porosity.

EXAMPLE 4

Several solid rectangular composites with edge dimensions of about 0.95 cm×1.27 cm×2.70 cm (⅜×½×1 1/16 inches) were fabricated using the following four combinations of diamond particle size and concentration:

| SAMPLE NO. | PARTICLE SIZE RANGE (mesh) | CONCENTRATION (volume %) |
|---|---|---|
| I | 230/270 | 15 |
| II | 230/270 | 30 |
| III | 60/80 | 15 |
| IV | 60/80 | 30 |

The fibrous graphite was fired before its admixture in with the non-diamond carbon coated diamond and its packing density in the uniform mixture was 0.4 gm/cc.

The resulting infiltrated composites were dense and no porosity was visually evident on cross-sectioned and ground surfaces of the composites.

I claim:

1. In a process for making a shaped polycrystalline body having a volume greater than 10 cubic millimeters comprised of a mass of crystals selected from diamond, cubic boron nitride, and combinations thereof adherently bonded together by a bonding medium of silicon carbide and elemental silicon, said crystals comprising between 1 and 70 volume percent of said body, which process comprises:

(a) infiltrating a substantially uniform mixture of said crystals and fibrous graphite with fluid silicon under a partial vacuum at a temperature above 1400° C.; and (b) cooling and recovering the infiltrated mass of crystals;

the improvement which comprises vacuum heat treating the fibrous graphite at a temperature between about 800° C. and 1700° C. followed by cooling and release of the vacuum prior to inclusion of the fibrous graphite into the said crystal mixture.

2. The improved process of claim 1 wherein a carbonaceous material is included in the substantially uniform crystal mixture of step (a) such that none of the surfaces of said crystals are exposed significantly and substantially all of said crystals are enveloped and separated by at least a coherent continuous coating of said carbonaceous material on said crystals, said carbonaceous material being selected from elemental non-diamond carbon, an organic material which completely decomposes at a temperature below 1400° C. to elemental non-diamond carbon and gaseous products of decomposition, and mixtures thereof;

wherein the mixture of crystals and carbonaceous material is placed in the cavity of a mold for step (a); and wherein step (a) is accomplished by associating a mass of silicon with said mixture in said cavity; providing a partial vacuum within the mold structure and heating the mold structure to a temperature above 1400° C. at which said silicon is fluid for infiltrating through the mixture, said infiltrating silicon reacting with the carbon present to form silicon carbide.

3. The process of claim 1 wherein said fibrous graphite has a nominal length to width ratio of between about 2:1 and 10:1.

4. The process of claim 3 wherein said ratio is between about 3:1 and 4:1.

5. The process of claim 1 wherein said crystals are diamond.

6. The process of claim 1 wherein said crystals are cubic boron nitride.

7. The process of claim 1 wherein said heat treatment is conducted for a time of between about 1 and 5 minutes.

* * * * *

UNITED STATES PATENT AND TRADEMARK OFFICE
CERTIFICATE OF CORRECTION

PATENT NO. : 4,381,271
DATED : April 26, 1983
INVENTOR(S) : Stephen C. Hayden

It is certified that error appears in the above-identified patent and that said Letters Patent are hereby corrected as shown below:

On the title page Item [75] Inventors: should read:

--- Stephen C. Hayden and Howard W. Brown, Columbus, Ohio ---.

Signed and Sealed this

Twenty-sixth Day of July 1983.

[SEAL]

Attest:

GERALD J. MOSSINGHOFF

Attesting Officer

Commissioner of Patents and Trademarks